(12) United States Patent
Redman, Jr.

(10) Patent No.: US 12,058,992 B2
(45) Date of Patent: Aug. 13, 2024

(54) FISH FIGHTING APPARATUS

(71) Applicant: Paul Redman, Jr., Pensacola, FL (US)

(72) Inventor: Paul Redman, Jr., Pensacola, FL (US)

( * ) Notice: Subject to any disclaimer, the term of this patent is extended or adjusted under 35 U.S.C. 154(b) by 0 days.

(21) Appl. No.: 18/083,982

(22) Filed: Dec. 19, 2022

(65) Prior Publication Data
US 2024/0172735 A1 May 30, 2024

Related U.S. Application Data

(63) Continuation of application No. 18/072,135, filed on Nov. 30, 2022.

(51) Int. Cl.
| | |
|---|---|
| *A01K 97/22* | (2006.01) |
| *A01K 97/10* | (2006.01) |
| *B63B 29/04* | (2006.01) |
| *B63B 29/06* | (2006.01) |

(52) U.S. Cl.
CPC .............. *A01K 97/22* (2013.01); *A01K 97/10* (2013.01); *B63B 2029/043* (2013.01); *B63B 29/06* (2013.01)

(58) Field of Classification Search
CPC .. A01K 97/22; A01K 97/10; B63B 2029/043; B63B 29/04; A47C 1/11; A47C 1/16; A47D 1/00; A47D 1/02; A47D 1/006; A47D 1/0085; A47D 1/10; A47D 1/103; A47D 1/106; B60N 2/28; B60N 2/2839; B60N 2/2866; B60N 2/2887; B60N 2/289; B60N 2/2893; B60N 2002/2896
See application file for complete search history.

(56) References Cited

U.S. PATENT DOCUMENTS

| | | | | | |
|---|---|---|---|---|---|
| 2,731,072 | A | * | 1/1956 | Post ...................... | A47D 1/004 |
| | | | | | D6/333 |
| 2,963,076 | A | * | 12/1960 | Hyman ................... | A47D 1/00 |
| | | | | | 297/154 |
| 3,052,500 | A | * | 9/1962 | Hyde ..................... | B60N 2/283 |
| | | | | | 297/254 |
| 3,572,830 | A | * | 3/1971 | Storer ................... | A47D 15/006 |
| | | | | | 297/130 |
| 4,460,216 | A | * | 7/1984 | Keller .................... | A01K 97/22 |
| | | | | | 248/416 |

(Continued)

FOREIGN PATENT DOCUMENTS

KR          20210034151 A  *  3/2021

*Primary Examiner* — Darren W Ark
*Assistant Examiner* — Katelyn T Truong
(74) *Attorney, Agent, or Firm* — Bradley Arant Boult Cummings LLP; Rudy Hill; Jessica L. Zurlo

(57) ABSTRACT

The present disclosure provides an improved fish fighting apparatus that can be used by youth anglers, such as children, to assist in the capture of fish. The fish fighting apparatus includes a base frame having a plurality of vertical supports extending upwardly therefrom, an upper frame attached to the vertical supports and positioned above the base frame, a seat attached to the base frame, where the base frame, the upper frame, the vertical support, and the seat together define a seating area, a rod holder attached to the base frame and forming a pair of longitudinally spaced-apart openings between the base frame and the upper frame, and a mounting assembly attached to an underside of the seat and configured for mounting on a gunwale of a fishing vessel.

19 Claims, 8 Drawing Sheets

(56) References Cited

U.S. PATENT DOCUMENTS

| | | | | |
|---|---|---|---|---|
| 4,586,746 | A * | 5/1986 | Day | A47D 1/106 |
| | | | | 297/134 |
| 4,835,896 | A * | 6/1989 | Bowen | A01K 97/22 |
| | | | | 297/188.2 |
| 5,937,564 | A * | 8/1999 | Perreault | A01K 97/10 |
| | | | | 43/4.5 |
| 6,435,614 | B1 * | 8/2002 | Gollahon | A01K 97/10 |
| | | | | 297/440.16 |
| 7,146,763 | B1 * | 12/2006 | Stanton | A01K 97/10 |
| | | | | 114/364 |
| 7,461,891 | B1 * | 12/2008 | Andersen | A47D 1/0085 |
| | | | | 297/16.1 |
| 7,837,273 | B1 * | 11/2010 | Ratza | B63B 29/04 |
| | | | | 297/452.56 |
| 7,882,795 | B1 * | 2/2011 | Snyder | B63B 29/04 |
| | | | | 248/425 |
| 8,251,455 | B1 * | 8/2012 | Midkiff | A01K 97/10 |
| | | | | 296/64 |
| 9,788,662 | B1 * | 10/2017 | Hollett | A47D 1/006 |
| 11,234,522 | B1 * | 2/2022 | Marvin | A47C 3/16 |
| 2005/0179288 | A1 * | 8/2005 | Lizaso | B63B 29/04 |
| | | | | 297/250.1 |
| 2017/0339937 | A1 * | 11/2017 | Erdmann | A01K 97/10 |
| 2018/0160669 | A1 * | 6/2018 | Pipe | B63B 29/04 |

* cited by examiner

FISH FIGHTING APPARATUS

FIELD OF THE INVENTION

The present disclosure relates generally to an apparatus for assisting an angler, particularly a youth angler, in the capture of any fish, including large fish.

BACKGROUND OF THE INVENTION

When fishing for game fish, such as bluefin and bigeye tuna, marlin, swordfish, or shark, anglers typically employ a fighting chair. A fighting chair provides the angler with a place to sit and provides support to the angler while reeling in the hooked fish. Generally, in practice, when a fish is hooked on the fishing rod, the angler removes the rod from the holder and makes their way into the fighting chair to assist in the capture of the fish. The fighting chair is considered indispensable in fighting game fish.

Conventional fighting chairs typically include a footrest and armrests, a safety harness, and a harness and gimbal for the fishing rod. The fighting chair itself can also rotate, allowing the angler or an assistant to change the position of the chair as the fish moves. While these fighting chairs can help anglers land fish by providing additional leverage and stability, the fighting chairs are generally intended for adults only. Safety with existing fighting chairs is a problem for children who attempt to use them. For example, existing chairs do not have properly sized restraints for children, and if the child is not properly restrained while fighting a fish, they can be pulled out of the chair or even overboard. Additionally, existing fighting chairs are typically mounted to the deck of a boat, which makes it difficult for a child who is seated in the chair to see the fishing line and have control over the rod.

Moreover, there are general difficulties with children catching fish from a boat. For example, due to their smaller size and strength, children generally have less leverage and stability than adults when reeling in a fish. This increases the risk of potential injury to the child. For instance, the child can get injured by falling in the boat or getting pulled overboard. Without proper leverage and stability, the child also risks losing the fishing rod.

Accordingly, there remains a need in the art for a fish fighting apparatus, such as a fighting chair, that can be used by youth anglers and that allows the anglers to safely and successfully catch fish from a boat.

SUMMARY OF THE INVENTION

The problems expounded above, as well as others, are addressed by the following inventions, although it is to be understood that not every embodiment of the inventions described herein will address each of the problems described above.

In some embodiments, an apparatus for fighting fish is provided, the apparatus including a base frame including a vertical support extending upwardly therefrom, an upper frame attached to the vertical support and positioned above the base frame, a seat attached to the base frame, wherein the base frame, the upper frame, the vertical support, and the seat together define a seating area, and a tubular member attached to the base frame and forming a pair of openings between the base frame and the upper frame. In one embodiment, the base frame includes a plurality of vertical supports extending upwardly therefrom. In another embodiment, the upper frame includes a front railing, a back railing, and a pair of side railings, and the front railing, the back railing, and the pair of side railings are integrally formed with one another. In still another embodiment, the seat includes a seat frame having a pair of lateral members attached to the base frame and a seating surface extending laterally between the lateral members of the seat frame. In yet another embodiment, the apparatus further includes a pedestal attached to the seat and configured for mounting onto a gunwale of a fishing vessel. In further embodiments, the pedestal is configured to slide into a rod holder in the gunwale. In still further embodiments, the seating area is dimensioned to accommodate a child. In other embodiments, the tubular member is configured to secure a base end of a fishing rod.

In further embodiments, an apparatus for fighting fish is provided, the apparatus including a base frame including a plurality of vertical supports extending upwardly therefrom, an upper frame attached to the vertical supports and positioned above the base frame, a seat attached to the base frame, wherein the base frame, the upper frame, the vertical supports, and the seat together define a seating area, a tubular member attached to the base frame and forming a pair of openings between the base frame and the upper frame, and a mounting assembly attached to an underside of the seat and configured for mounting on a gunwale of a fishing vessel. In some embodiments, the upper frame includes a front railing, a back railing, and a pair of side railings, and the front railing, the back railing, and the pair of side railings are integrally formed with one another. In other embodiments, the seat includes a seat frame having a pair of lateral members attached to the base frame and a seating surface extending laterally between the lateral members of the seat frame. In still other embodiments, the base frame, the upper frame, and the vertical supports are made of aluminum tubing. In some embodiments, the tubular member is configured to secure a base end of a fishing rod. In further embodiments, the tubular member is attached to the base frame at an angle of about 70 degrees or less relative to the base frame. In still further embodiments, the seating area is dimensioned to accommodate a child.

In some embodiments, an apparatus for fighting fish is provided, the apparatus including a base frame including a plurality of vertical supports extending upwardly therefrom, an upper frame attached to the vertical supports, a seating surface attached to the base frame, a rod holder attached to the base frame and forming a pair of longitudinally spaced-apart openings between the base frame and the upper frame, and a mounting assembly configured for attachment to a gunwale of a fishing vessel, wherein the mounting assembly includes a base attached to an underside of the seating surface, and a pedestal attached to the base and configured for insertion into a corresponding slot on the gunwale. In further embodiments, the pedestal is cylindrical in shape. In still further embodiments, the plurality of vertical supports are evenly distributed around the perimeter of the base frame. In yet further embodiments, the upper frame includes a front railing, a back railing, and a pair of side railings, and the front railing, the back railing, and the pair of side railings are integrally formed with one another. In further embodiments, the seating surface is dimensioned to accommodate a child.

BRIEF DESCRIPTION OF THE DRAWINGS

Further Features and Advantages of the Invention can be Ascertained from the Following Detailed Description that is Provided in Connection with the Drawings Described Below.

DETAILED DESCRIPTION OF THE INVENTION

Figure 1:
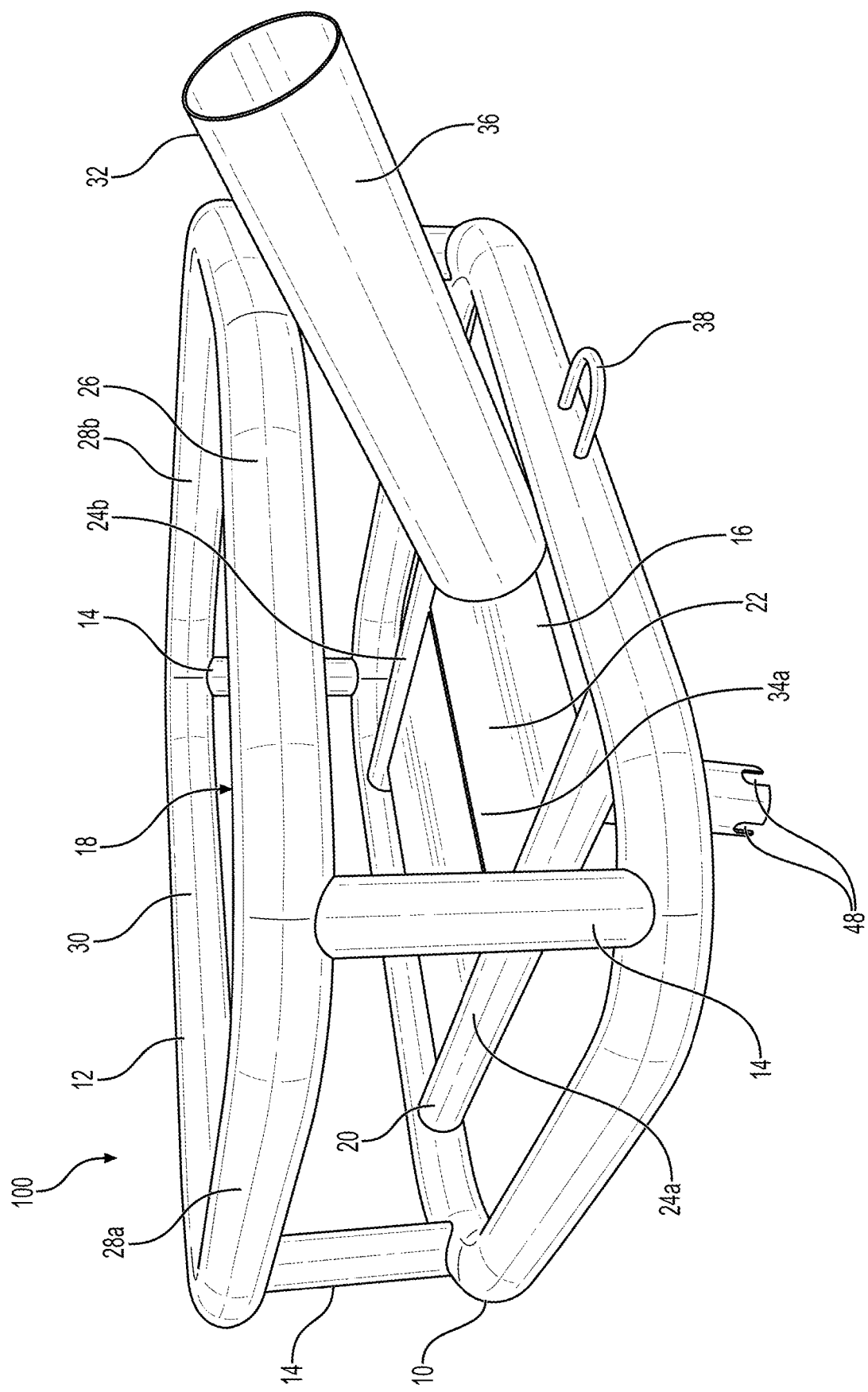
FIG. 1 is a front perspective view of a fish fighting apparatus according to one embodiment of the present disclosure.
Figure 2:
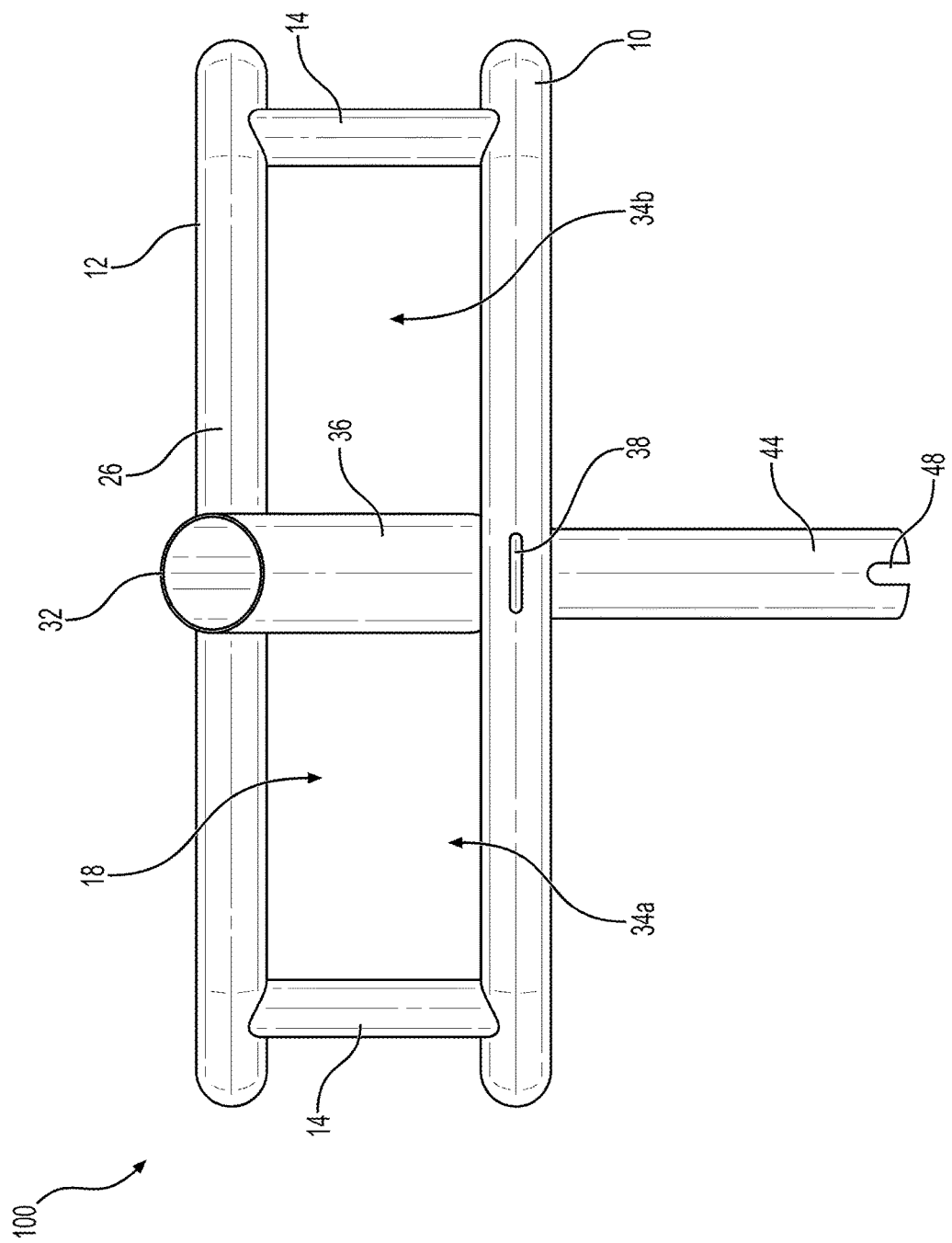
FIG. 2 is a front view of the fish fighting apparatus shown in FIG. 1.
Figure 3:
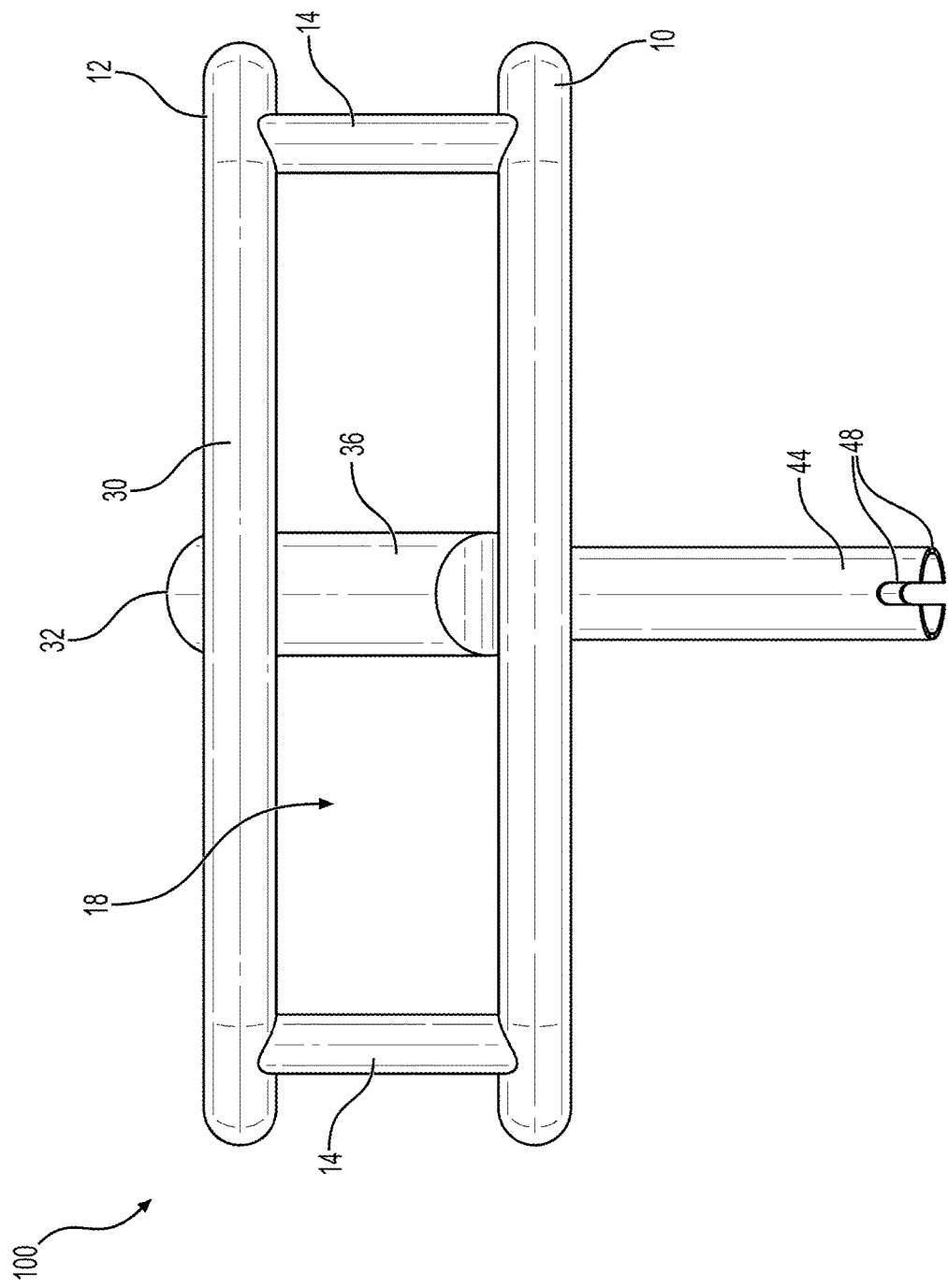
FIG. 3 is a back view of the fish fighting apparatus shown in FIG. 1.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings. It will be understood that the spatially relative terms are intended to encompass different orientations of the apparatus in use or operation in addition to the orientation depicted in the figures. For example, if the apparatus in the figures is turned over or rotated, elements described as "below," or "beneath" other elements or features would then be oriented "above" the other elements or features. Thus, the exemplary term "below" can encompass both an orientation of above and below. The apparatus can be otherwise oriented (rotated 90 degrees or at other orientations) and the spatially relative descriptors used herein interpreted accordingly.

The term "substantially" allows for deviations from the descriptor that do not negatively impact the intended purpose. Descriptive terms are understood to be modified by the term "substantially" even if the word "substantially" is not explicitly recited.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides an improved fish fighting apparatus, for example, a fighting chair, that can be used by youth anglers, such as children, to assist in the capture of any type of fish. In some embodiments, the fish fighting apparatus of the present disclosure is configured for attachment to an edge of a fishing vessel (i.e., the gunwale). The fish fighting apparatus of the present disclosure allows a youth angler, such as a child, more control and leverage over the fishing rod when fighting a fish and substantially reduces the effort required to fight the fish. In addition, by positioning the fish fighting apparatus on the gunwale, it provides a more comfortable position for the child in that they can face directly toward the fish and the fishing line is in their direct eyesight. The fish fighting apparatus of the present disclosure also provides additional stability for the youth angler by limiting their ability to move (for example, stumble and fall) or get pulled out of the boat.

Referring to FIGS. 1-7, a fish fighting apparatus 100 according to an exemplary embodiment of the present disclosure is shown. The fish fighting apparatus 100 is generally configured as a chair and for attachment to a fishing vessel, such as an edge of the fishing vessel. The fish fighting apparatus 100 includes a base frame 10 from which a plurality of vertical supports 14 extend upwardly. As shown in FIG. 1, an upper frame 12 is attached to the plurality of vertical supports 14 such that the upper frame 12 and the base frame 10 are laterally spaced apart. In one embodiment, the upper frame 12 and the base frame 10 are substantially parallel with one another. A seat 16 is attached to the base frame 10. The base frame 10, the upper frame 12, the plurality of vertical supports 14, and the seat 16 together define a seating area 18 in which an angler, such as a child, may sit while reeling in a hooked fish.

The base frame 10 forms the bottom perimeter of the fish fighting apparatus 100 and serves as a surface for which the plurality of vertical supports 14 are attached thereto. In the illustrated embodiment, four vertical supports 14 are attached to the base frame 10. The four vertical supports 14 are evenly distributed along the perimeter of the base frame 10 to support the upper frame 12. As shown in FIG. 1, a vertical support 14 is positioned at each corner of the base frame 10. However, as will be apparent to those skilled in the art, the number of vertical supports 14 and the spacing thereof may vary depending on the strength of the material used to form the frames and the size of the overall fish fighting apparatus. Larger fish fighting apparatuses may utilize additional vertical supports 14. The vertical supports 14 may be attached to the base frame 10 and the upper frame 12 using any suitable attachment mechanism. In some embodiments, the vertical supports 14 may be integrally formed with or otherwise irreversibly joined together with the base frame 10 and the upper frame 12, such as by a welded connection. In other embodiments, the vertical supports 14 may be attached to the base frame 10 and the upper frame 12 using a mechanical fastener, such as a screw, a tab, a bolt, a rivet, a nail, a nut, a key, an anchor, a stud, a ring, a pin, or any other fastener commonly used to secure structural members.

As illustrated in FIG. 1, the seat 16 is attached to the base frame 10. The seat 16 includes a seat frame 20 having a seating surface 22 affixed thereto. The seat frame 20 includes a pair of laterally spaced-apart members 24a, 24b. Each end of the members 24a, 24b are attached to the base frame 10. The seating surface 22 extends laterally between the members 24a, 24b. The seating surface 22 illustrated in the Figures is formed of two flat panels attached to one another; however, the seating surface 22 may be formed of any number of panels so long as the seating surface 22 is able to support a user seated thereon.

The seating surface 22 may be formed of any suitable material having a contour designed to provide a comfortable seating surface. For instance, the seating surface 22 may be made of steel, wood, or plastic, such as polyvinyl chloride. In some embodiments, a cushion (not shown) may be removably affixed to the seating surface 22 to provide additional comfort. In further embodiments, the seating surface 22 may include non-slip pads affixed thereto to prevent the user from sliding off the surface. In still further embodiments, the seating surface 22 may include a plurality of straps or a harness that may be used as a restraint to further secure the user when seated within the seating area 18. For example, in some embodiments, the seating surface 22 may include a seat belt as a restraint.

The upper frame 12 is positioned above the base frame 10 and supported by the plurality of vertical supports 14. The upper frame 12 serves as a guard rail to prevent a user seated within the seating area 18 from coming out of the fish fighting apparatus 100. The upper frame 10 is comprised of a front railing 26, a pair of side railings 28a, 28b, and a back railing 30. The front railing 26 extends between front portions of the side railings 28a, 28b and prevents a user from falling forward. The side railings 28a, 28b extend between the front railing 26 and the back railing 30 and function as armrests for a user seated in the seating area 18. The back railing 30 extends between rear portions of the side railings 28a, 28b and supports the back of the user seated in the seating area 18. In the illustrated embodiment, the front railing 26, the pair of side railings 28a, 28b, and the back railing 30 are integrally formed with one another to form a continuous structure. For example, the front railing 26, the pair of side railings 28a, 28b, and the back railing 30 may be welded together to form a continuous structure. In other embodiments, the front railing 26, the pair of side railings 28a, 28b, and the back railing 30 may be formed as separate structures and can be attached to one another by a mechanical fastener, such as a screw, a tab, a bolt, a rivet, a nail, a nut, a key, an anchor, a stud, a ring, a pin, or any other fastener commonly used to secure structural members.

In the illustrated embodiment, the seating area 18 defined by the base frame 10, the upper frame 12, the plurality of vertical supports 14, and the seat 16 is generally dimensioned to accommodate a user. In some embodiments, the user is a child. In this embodiment, as will be appreciated from the description herein, the seating area 18 may be dimensioned for supporting children of any age. For example, the seating area 18 may be dimensioned to appropriately accommodate a toddler (for example, a child aged 1-3), a preschooler (for example, a child aged 3-5), or a grade-schooler (for example, a child aged 5-12). In addition, in some embodiments, the upper frame 12 may be configured to be height adjustable in order to selectively raise or lower the upper frame 12 to accommodate children of varying heights and ages. For instance, in one embodiment, the plurality of vertical supports 14 may be telescoping supports that can raise and lower the upper frame 12.

As shown in FIGS. 1-7, the base frame 10 and the upper frame 12 are substantially square in shape and have rounded edges to prevent injury to the user seated therein. However, the base frame 10 and the upper frame 12 may have any shape that is suitable for use as a chair. For instance, the base frame 10 and the upper frame 12 can have a shape that is substantially rectangular, substantially triangular, or substantially circular.

As best illustrated in FIG. 1, a tubular member, referred to herein as a rod holder, 32 is attached to the base frame 10. The rod holder 32 is adapted to receive the butt end of a fishing rod (not shown). The rod holder 32 is attached at the center of the base frame 10 to form a pair of longitudinally spaced-apart leg openings 34a, 34b between the base frame 10 and the upper frame 12. When seated within the seating area 18, the placement of the rod holder 32 allows the user to place one leg through each of the leg openings 34a, 34b such that the rod holder 32 is positioned between the user's legs. The placement of the rod holder 32 also helps prevent a user from sliding off the seating surface 22. In some embodiments, a portion of the rod holder 32 may also be attached to the upper frame 12 to ensure a secure attachment to the fish fighting apparatus 100.

Figure 4:
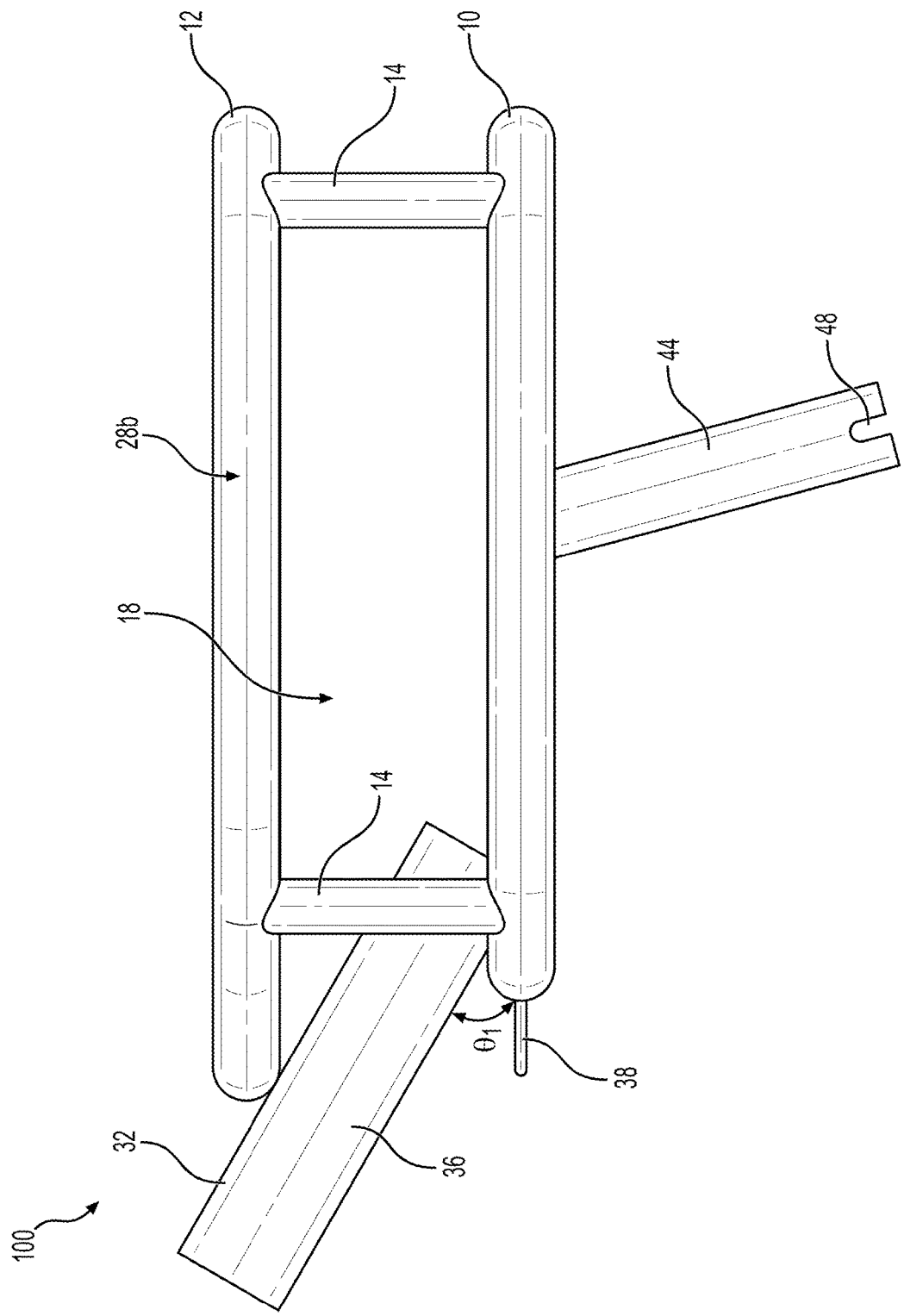
FIG. 4 is a first side view of the fish fighting apparatus shown in FIG. 1.
Figure 5:
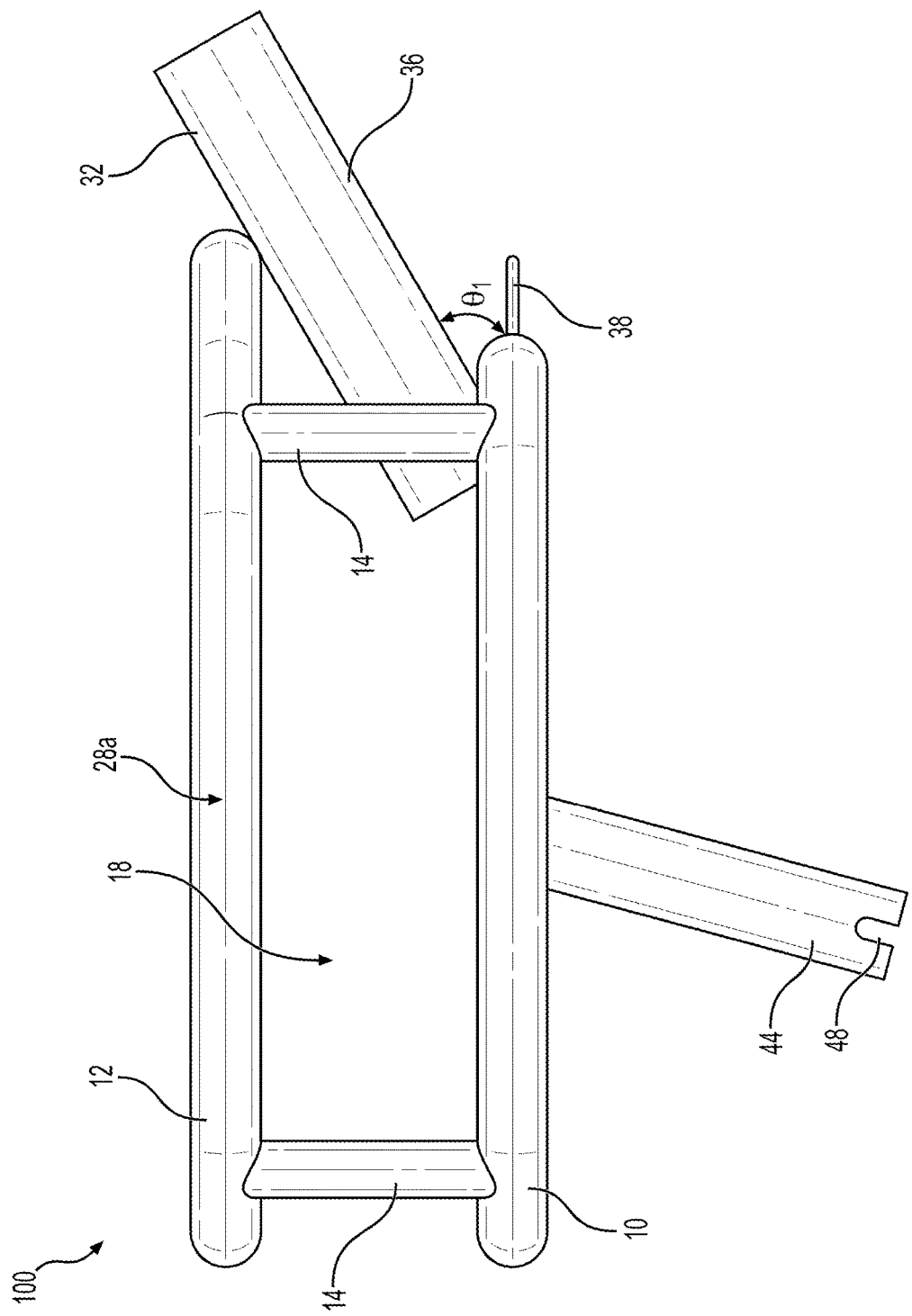
FIG. 5 is a second side view of the fish fighting apparatus shown in FIG. 1.
Figure 6:
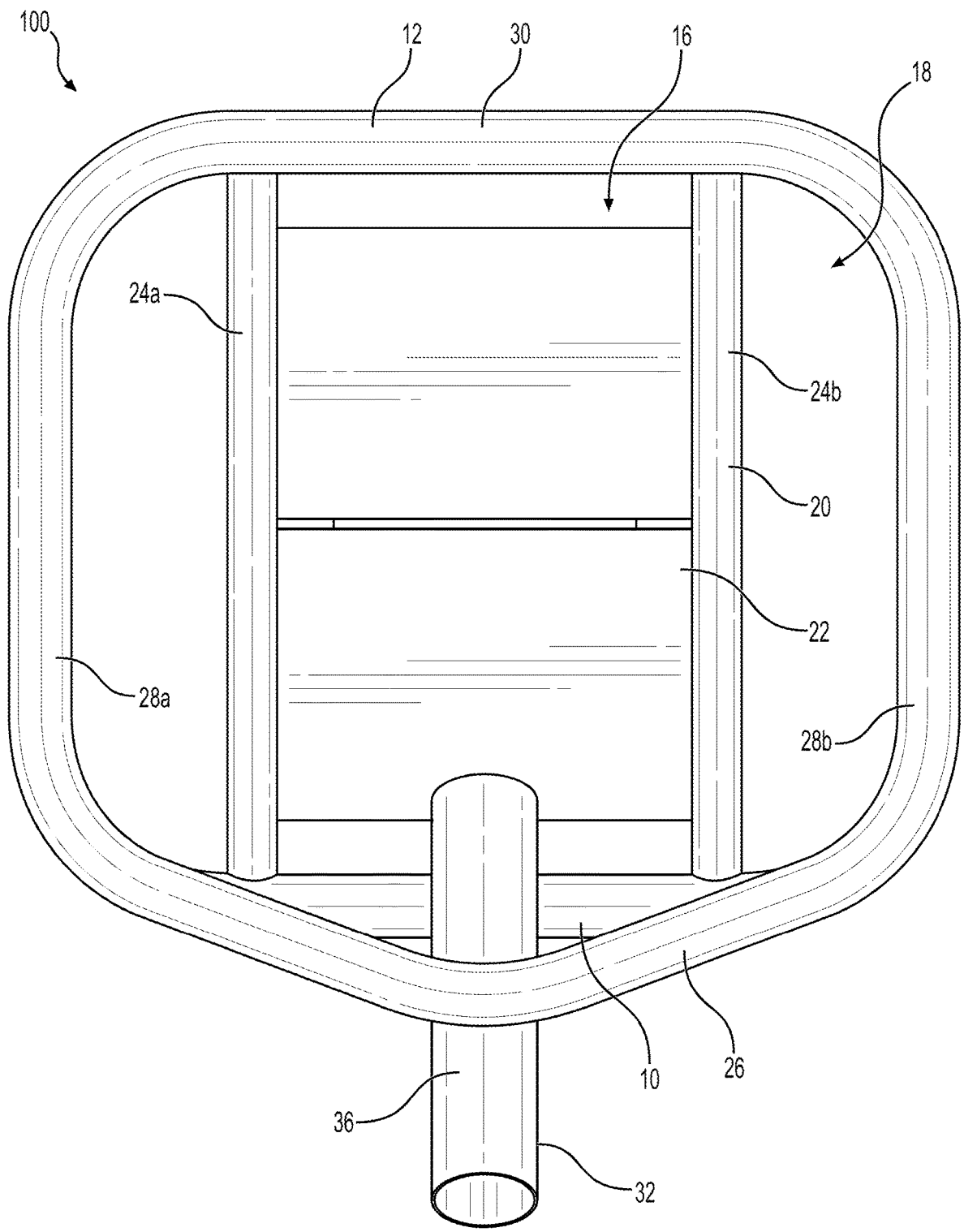
FIG. 6 is a top view of the fish fighting apparatus shown in FIG. 1.

As illustrated in the Figures, the rod holder 32 is attached to the base frame 10 at an angle so as to allow for the fishing rod to be maintained at an inclined position to increase the leverage provided when fighting a fish. In some embodiments, the angle of the placement of the rod holder 32 relative to the base frame 10, represented by $\theta_1$ in FIG. 4, is about 70 degrees or less. In further embodiments, the angle of the placement of the rod holder 32 relative to the base frame 10 is about 50 degrees or less. In still further embodiments, the angle of the placement of the rod holder 32 relative to the base frame 10 is about 30 degrees or less. In this embodiment, the fishing rod can be maintained in an inclined position and left unattended if so desired. When a fish bites onto the bait, the user can simply pull upward on the fishing rod and reel the fish in while seated in the seating area 18.

The rod holder 32 has a hollow, cylindrically shaped body 36 having a sufficient cross-section to receive an end of a conventional fishing rod. In some embodiments, the rod holder 32 may include a gimbal (not shown). In this embodiment, the rod holder 32 may be gimbal mounted so that it can move forward and backward and from side to side. The butt or handle end of the fishing rod can be received in the gimbal, which pivotally supports the rod while reeling in a hooked fish. Generally, gimbals include a recess within which a fixed cross pin in the gimbal socket is received, thereby pivotally supporting the lower end of the rod to permit substantial freedom of movement. Any conventional gimbals may be used with the rod holder 32 described herein.

In some embodiments, as shown in FIG. 1, a closed hook 38 may be positioned on a front portion of the base frame 10. In the illustrated embodiment, the hook 38 is U-shaped; however, the hook 38 may have any other suitable shape. A closed hook similar to the hook 38 may also be positioned on a back portion of the base frame 10. The hooks 38 can be used to secure the fish fighting apparatus 100 to the fishing vessel and to secure the user, such as the child seated within the seating area 18, to the fish fighting apparatus 100. For instance, a securing mechanism, such as a strap, may have one end configured to latch onto the hook 38 and another end to latch onto the fishing vessel to secure the fish fighting apparatus 100 and/or to the user seated in the fish fighting apparatus 100.

The fish fighting apparatus 100 is configured for mounting onto a surface of a fishing vessel. For example, the fish fighting apparatus 100 may be mounted onto any type of fishing boat, including, but not limited to, center console boats, dual console boats, walkaround boats, power catamaran boats, convertible sportfishing boats, bay boats, flats, and skiffs. In some embodiments, the fish fighting apparatus 100 is configured for mounting onto an upper edge of a vessel's side, also known as the gunwale. For example, in some embodiments, the fish fighting apparatus is designed to slide down into a rod holder embedded in the gunwale of a boat such that the fish fighting apparatus can be easily removed and used at various places around the boat. This positioning allows the user, such as a child, to be in closer proximity to the water and to have better control over the fishing rod when reeling in a fish. However, as will be appreciated by those skilled in the art, the fish fighting apparatus 100 may be mounted onto any surface of a fishing vessel so long as the user is able to fight and reel in the hooked fish.

Figure 7:
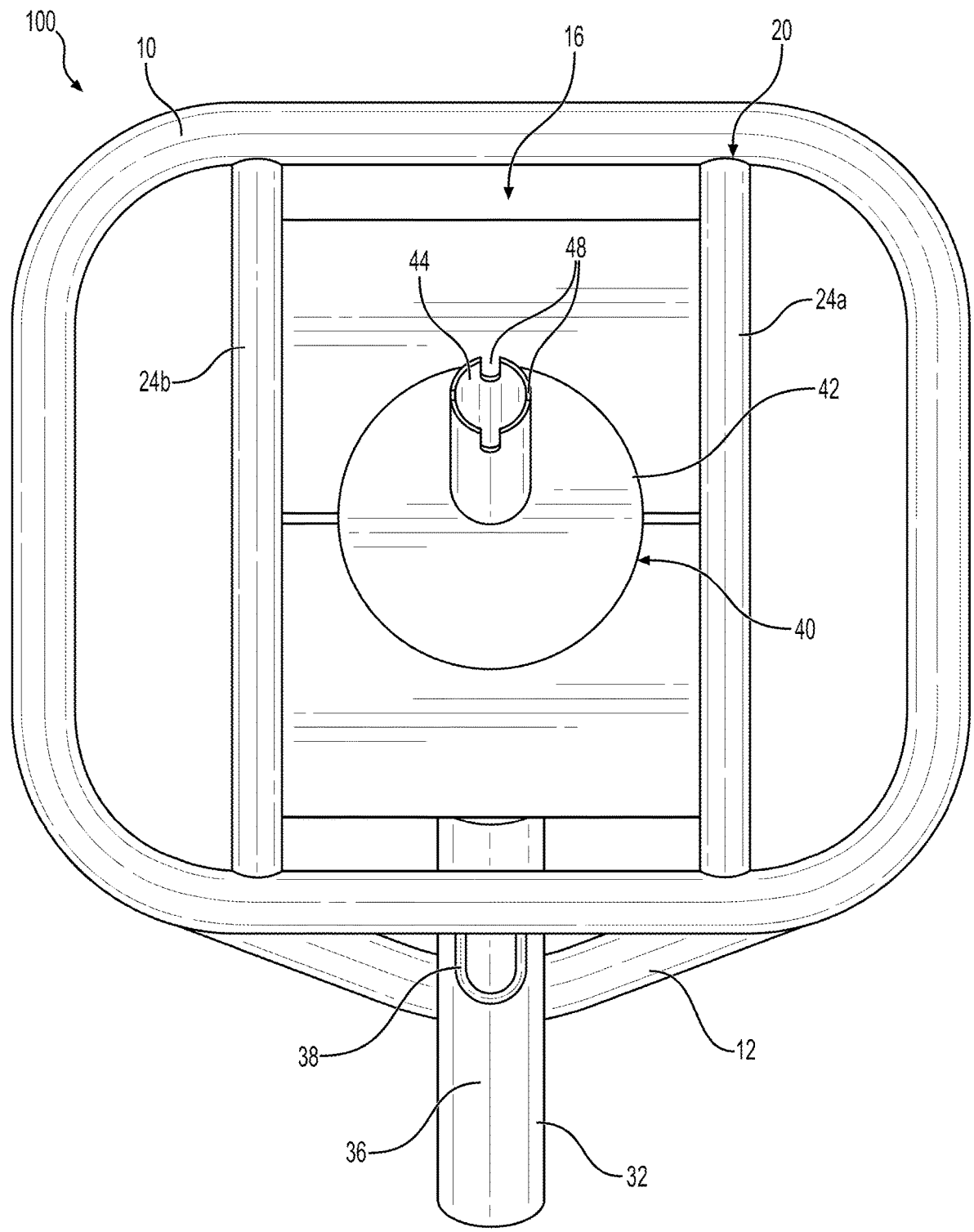
FIG. 7 is a bottom view of the fish fighting apparatus shown in FIG. 1.
Figure 8:
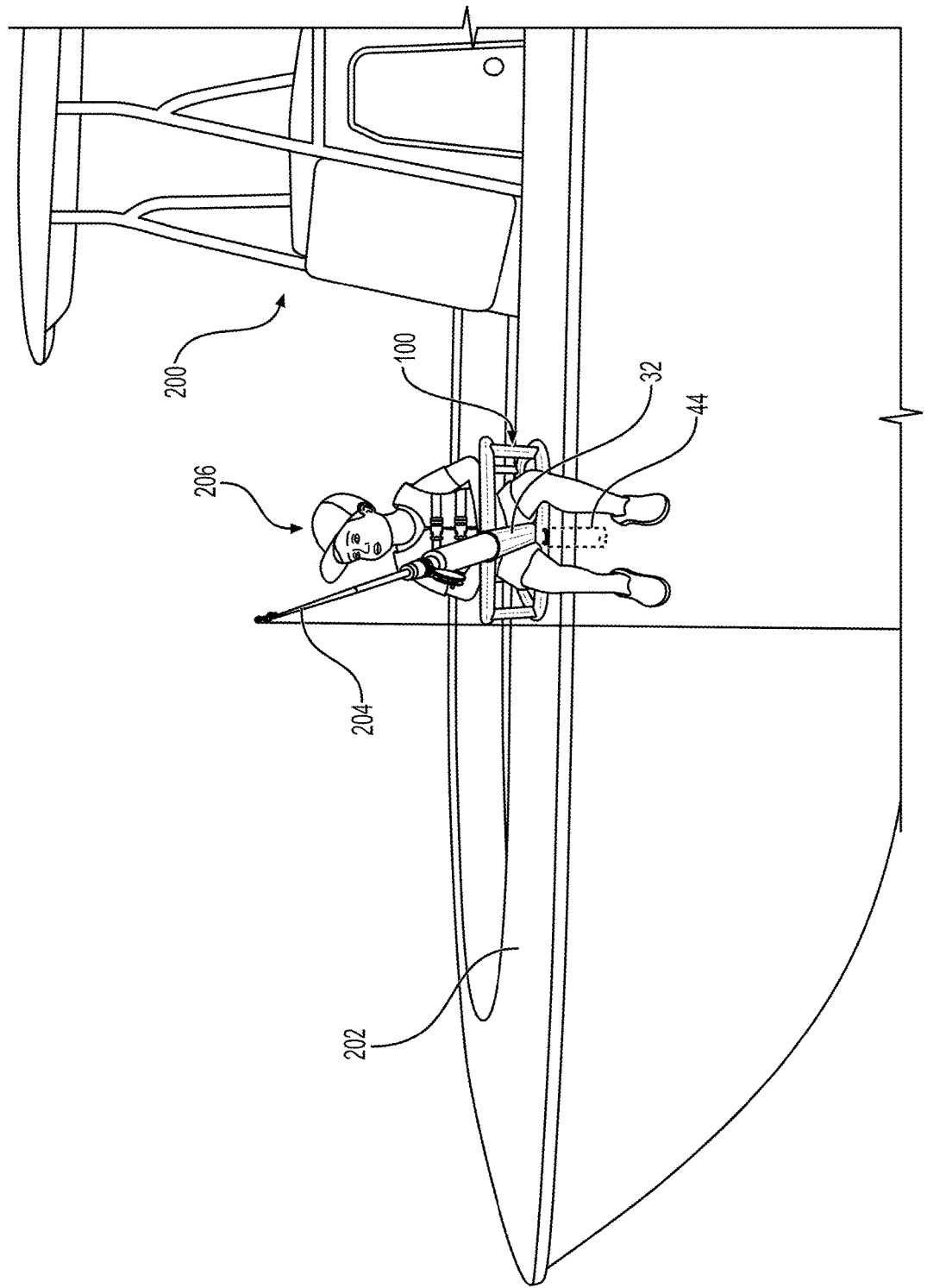
FIG. 8 is front perspective view of the fish fighting apparatus shown in FIG. 1 attached to a fishing vessel according to one embodiment of the present disclosure.

FIG. 7 shows a mounting assembly 40 for attaching the fish fighting apparatus 100 to a surface of a fishing vessel according to one embodiment of the present disclosure. The mounting assembly 40 includes a circular shaped base 42 and a pedestal 44 attached thereto. The base 42 is configured to attach to the underside of the seating surface 22. The pedestal 44 is configured for insertion into a slot on a surface of the fishing vessel (not shown). In one embodiment, the pedestal 44 is configured for sliding into a conventional rod holder embedded in the gunwale. The pedestal 44 can slide into the slot, for example, a rod holder, such that the seat 16 of the fish fighting apparatus 100 rests on the surface of a gunwale of the boat (as depicted in FIG. 8). The pedestal 44 includes a plurality of notches 48 on an end opposite the end attached to the base 42 (i.e., the distal end). The notches 48 are designed to correspond to notches on the inner bottom portion of the slot, or the rod holder, and lock the fish fighting apparatus 100 in place once the pedestal 44 is inserted into the slot. As shown in the Figures, the distal end of the pedestal 44 includes four notches 48 evenly spaced around the circumference of the distal end. The notches 48 are generally U-shaped but may have any other shape that matches corresponding notches on the slot or rod holder.

As shown in the Figures, the pedestal 44 is attached to the underside of the seating surface 22 at an angle. This angle should generally correspond to the angle of the corresponding slot, for example, the angle of the rod holder embedded in the gunwale. As described above with respect to the rod holder 32, most rod holders on the gunwale of a fishing vessel are mounted at an angle to allow for a fishing rod placed therein to be maintained at an inclined position to increase the leverage provided when reeling in a fish. In some embodiments, the pedestal 44 may be attached to the underside of the seating surface 22 at an angle of about 22 degrees to accommodate slots or rod holders angled at that degree. In other embodiments, the pedestal 44 may be attached to the underside of the seating surface 22 at an angle of about 33 degrees to accommodate slots or rod holders angled at the same degree. In still other embodiments, the pedestal 44 may be attached to the underside of the seating surface 22 at an angle of about 45 degrees to accommodate slots or rod holders angled at the same degree. In still further embodiments, the pedestal 44 may be attached to the underside of the seating surface 22 at an angle of about 90 degrees to accommodate completely straight slots or rod holders. In some embodiments, the angle at which the pedestal 44 is attached to the underside of the seating surface 22 is adjustable to accommodate varying slots or rod holders.

In the illustrated embodiment, the pedestal 44 has a hollow, cylindrically shaped body. In this embodiment, the corresponding slot, for example, a rod holder, on the surface of the fishing vessel may also be cylindrically shaped to match the cross-sectional shape of the pedestal 44. However, the pedestal 44 and the corresponding slot may have any other suitable shape that allows for the fish fighting apparatus 100 to be securely attached to the fishing vessel.

In some embodiments, the base 42 may optionally include a plurality of installation holes (not shown) spaced about the circumference of the base 42. The installation holes can provide locations where fasteners or the like (not shown) can be inserted to fix the pedestal 44 in position. In other embodiments, the pedestal 44 can be attached directly to the underside of the seating surface 22, which dispenses of the need for the base 42. For example, the pedestal 44 can be welded directly to the underside of the seating surface 22.

The pedestal 44 should be sufficiently sized to mount the fish fighting apparatus 100 on to the fishing vessel. In some embodiments, the pedestal 44 (and the corresponding slot) should have a depth sufficient to allow for the fish fighting apparatus 100 to be securely mounted. The depth of the pedestal 44 can vary depending on the depth of the corresponding slot or rod holder. However, the depth of the pedestal 44 and the corresponding slot should be substantially the same so that when the pedestal 44 is inserted into the slot, the fish fighting apparatus 100 sits flush with the surface of the gunwale of the fishing vessel. For example, in some embodiments, the pedestal 44 (and the corresponding slot) may have a depth of at least about 6 inches. In further embodiments, the pedestal 44 (and the corresponding slot) may have a depth of at least about 8 inches. In still further embodiments, the pedestal 44 (and the corresponding slot) may have a depth of at least about 10 inches. In yet further embodiments, the pedestal 44 (and the corresponding slot) may have a depth of at least about 12 inches.

While the mounting assembly 40 shown in FIG. 7 has been shown herein as an exemplary attachment mechanism, those skilled in the art will understand that the fish fighting apparatus 100 may be mounted to the fishing vessel using other mechanisms. For example, the fish fighting apparatus 100 can be mounted directly onto the gunwale of the fishing vessel using a mechanical fastener, such as screws or bolts.

FIG. 8 shows the fish fighting apparatus 100 attached to a fishing vessel 200. As shown in FIG. 8, the fish fighting apparatus 100 is mounted onto a gunwale 202 of the fishing vessel 200. A fishing rod 204 may be secured in the rod holder 32. In use, once a fish bites onto the bait, the user 206, for example, a child, may climb into the fish fighting apparatus 100 and position him or herself within the seating area 18 such that each leg is placed through the leg openings 34a, 34b and the rod holder 32 is positioned between the user's legs. Using the leverage of the fish fighting apparatus 100, the user 206 can fight and reel in a hooked fish.

The various components of the fish fighting apparatus 100 described herein may be constructed or manufactured from materials, such as various polymers, plastics, stainless steel, aluminum, and combinations thereof. However, it should be noted that the component parts of the various embodiments of the disclosure should be made of materials having sufficient strength and durability to withstand the stresses that will be encountered. The materials should also be able to withstand being located in an exposed marine environment and avoid corrosion. In some embodiments, a high strength material, such as steel, may be used to construct the components of the fish fighting apparatus 100. In further embodiments, a high strength but substantially lightweight material such as aluminum or anodized aluminum can be used. For example, aluminum tubing may be used. The connections between one component to another can be accomplished using techniques well known and suitable for a marine environment, such as bolts, machine screws, welding, and epoxy. Similarly, the various parts described herein may be constructed according to various manufacturing methods including injection molding, milling, forging, extrusion, pressing, 3D printing, and other related manufacturing methods.

The apparatus described and claimed herein is not to be limited in scope by the specific embodiments herein disclosed, since these embodiments are intended as illustrations of several aspects of the disclosure. Any equivalent embodiments are intended to be within the scope of this disclosure. Indeed, various modifications of the apparatus in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. An apparatus for fighting fish, comprising:
a base frame comprising a vertical support extending upwardly therefrom,
an upper frame attached to the vertical support and positioned above the base frame, the upper frame comprising a front railing, a back railing, and a pair of side railings, wherein the front railing, the back railing, and the pair of side railings are integrally formed with one another to form a continuous perimeter,
a seat attached to the base frame, wherein the base frame, the upper frame, the vertical support, and the seat together define a seating area, and
a tubular member having a proximal end attached to the base frame and a distal end extending outwardly below the upper frame, wherein the proximal end is disposed within a perimeter of the base frame and the distal end is disposed outside the perimeter of the upper frame, and the tubular member forms a pair of openings between the base frame and the upper frame.

2. The apparatus of claim 1, wherein the base frame comprises a plurality of vertical supports extending upwardly therefrom.

3. The apparatus of claim 1, wherein the seat comprises a seat frame having a pair of lateral members attached to the base frame and a seating surface extending laterally between the lateral members of the seat frame.

4. The apparatus of claim 1, further comprising a pedestal attached to the seat and configured for mounting onto a gunwale of a fishing vessel.

5. The apparatus of claim 4, wherein the pedestal is configured to slide into a rod holder in the gunwale.

6. The apparatus of claim 4, wherein the tubular member is attached to the base frame in front of the pedestal when the apparatus is mounted onto the gunwale of the fishing vessel.

7. The apparatus of claim 1, wherein the seating area is dimensioned to accommodate a child.

8. The apparatus of claim 1, wherein the tubular member is configured to secure a base end of a fishing rod.

9. The apparatus of claim 1, wherein the base frame is substantially square and comprises four vertical supports extending upwardly therefrom, wherein each vertical support is positioned at a corner of the base frame.

10. An apparatus for fighting fish, comprising:
a base frame comprising a plurality of vertical supports extending upwardly therefrom,
an upper frame attached to the vertical supports and positioned above the base frame, the upper frame comprising a front railing, a back railing, and a pair of side railings, wherein the front railing, the back railing, and the pair of side railings are integrally formed with one another to form a continuous perimeter,
a seat attached to the base frame, wherein the base frame, the upper frame, the vertical supports, and the seat together define a seating area,
a tubular member having a proximal end attached to the base frame and a distal end extending outwardly below the upper frame, wherein the proximal end is disposed within a perimeter of the base frame and the distal end is disposed outside the perimeter of the upper frame, and the tubular member forms a pair of openings between the base frame and the upper frame, and
a mounting assembly attached to an underside of the seat and configured for mounting on a gunwale of a fishing vessel.

11. The apparatus of claim 10, wherein the seat comprises a seat frame having a pair of lateral members attached to the base frame and a seating surface extending laterally between the lateral members of the seat frame.

12. The apparatus of claim 10, wherein the base frame, the upper frame, and the vertical supports are made of aluminum tubing.

13. The apparatus of claim 10, wherein the tubular member is configured to secure a base end of a fishing rod.

14. The apparatus of claim 10, wherein the tubular member extends outwardly from the base frame at an angle of 70 degrees or less relative to the base frame.

15. The apparatus of claim 10, wherein the seating area is dimensioned to accommodate a child.

16. An apparatus for fighting fish, comprising:
a base frame comprising a plurality of vertical supports extending upwardly therefrom,
an upper frame attached to the vertical supports, the upper frame comprising a front railing,
a back railing, and a pair of side railings, wherein the front railing, the back railing, and the pair of side railings are integrally formed with one another to form a continuous perimeter,
a seating surface attached to the base frame,
a fishing rod holder attached to the base frame and forming a pair of longitudinally spaced-apart openings between the base frame and the upper frame, wherein the fishing rod holder has a proximal end attached to the base frame and a distal end extending outwardly below the upper frame, wherein the proximal end is disposed within a perimeter of the base frame and the distal end is disposed outside the perimeter of the upper frame, and a mounting assembly configured for attachment to a gunwale of a fishing vessel, wherein the mounting assembly comprises:
- a base attached to an underside of the seating surface, and
- a pedestal attached to the base and configured for insertion into a corresponding slot on the gunwale.

17. The apparatus of claim 16, wherein the pedestal is cylindrical in shape.

18. The apparatus of claim 16, wherein the plurality of vertical supports are evenly distributed around the perimeter of the base frame.

19. The apparatus of claim 16, wherein the seating surface is dimensioned to accommodate a child.

\* \* \* \* \*